United States Patent [19]
Ewald

[11] Patent Number: 5,489,042
[45] Date of Patent: Feb. 6, 1996

[54] REUSABLE WASTE HANDLER FOR VEHICULAR OIL CHANGES

[76] Inventor: Bart W. Ewald, 2466 N. Heideke St., Seguin, Tex. 78155

[21] Appl. No.: 323,908

[22] Filed: Oct. 17, 1994

[51] Int. Cl.[6] .................................................. B65B 1/04
[52] U.S. Cl. ........................ 220/573; 220/572; 220/735; 141/98; 141/86; 141/364
[58] Field of Search ................. 220/571, 571.1, 220/572, 573, 729, 735, DIG. 6, 521, 306, 636, 630; 184/1.5, 106; 141/98, 86, 87, 364

[56] References Cited

U.S. PATENT DOCUMENTS

| | | | |
|---|---|---|---|
| 2,099,839 | 11/1937 | Chernoff | 141/86 |
| 2,389,672 | 11/1945 | Lippold | 141/86 |
| 3,703,956 | 11/1972 | Oswalt | 206/47 R |
| 4,013,105 | 3/1977 | Uuskalio | 220/571 |
| 4,020,922 | 5/1977 | Klasel | 184/1.5 |
| 4,114,660 | 9/1978 | Arruda | 220/573 |
| 4,296,838 | 10/1981 | Cohen | 184/106 |
| 4,301,841 | 11/1981 | Sandow | 141/98 |
| 4,332,282 | 6/1982 | Strange | 141/1 |
| 4,376,703 | 3/1983 | Krauss | 210/238 |
| 4,403,692 | 9/1983 | Pollacco | 206/223 |
| 4,488,584 | 12/1984 | Hestehave et al. | 141/339 |
| 4,533,042 | 8/1985 | Pollacco | 206/223 |
| 4,632,268 | 12/1986 | Melzi et al. | 220/1 C |
| 4,651,887 | 3/1987 | Patrick | 220/571 |
| 4,697,670 | 10/1987 | Arruda | 220/573 |
| 4,702,290 | 10/1987 | Perez | 141/332 |
| 4,802,599 | 2/1989 | Hill | 220/1 C |
| 4,815,591 | 3/1989 | Tivy | 206/223 |
| 4,823,947 | 4/1989 | Maynard, Jr. | 206/223 |
| 4,852,759 | 8/1989 | Williams et al. | 220/571.1 |
| 4,974,647 | 12/1990 | Eastom | 141/98 |
| 5,080,149 | 1/1992 | Peoples | 220/573 |
| 5,105,860 | 4/1992 | Connor | 141/106 |
| 5,172,739 | 12/1992 | Ristroph | 220/573 |
| 5,183,179 | 2/1993 | Morris, Sr. | 220/730 |
| 5,316,059 | 5/1994 | Lahnam et al. | 141/98 |

Primary Examiner—Stephen J. Castellano

[57] ABSTRACT

The present invention provides a way for the do-it-yourself oil and filter changer to safely and cleanly drain used oil from the filter, then seal and store both filter and drained filter oil in the same container that crankcase oil is collected and stored in while keeping the drained filter dry and separate from the drained and collected oil. The invention solves a recent problem that has become apparent as used oil filters have become a culprit of land and water pollution. By allowing the do-it-yourselfer a convenient, safe, clean, and economical way to manage his used oil filter along with his used oil, it hampers the tendency to improperly dispose of these recyclable wastes by allowing more convenient and cleaner transport of these wastes to a collection center. This reusable container also eliminates the disposable items currently being used to transport used oil filters, thus eliminating these oily wastes from the wastestream.

7 Claims, 2 Drawing Sheets

REUSABLE WASTE HANDLER FOR VEHICULAR OIL CHANGES

BACKGROUND—FIELD OF INVENTION

The field of invention relates to a recycling device and more specifically pertains to a waste oil filter and waste oil recycling device wherein said device is specific to the convenient and segregated handling of used oil filters and used oil from vehicular oil changes, which will promote recycling of same.

BACKGROUND—DESCRIPTION OF PRIOR ART

The inventor has submitted a patent application for a similar device, which has been given a application Ser. No. of 08/289246. While developing the original patent application, the "Reusable Used Oil Filter and Oil Recycling Container" (ROFORC), it occurred to the inventor that a reusable container could be made that would be less expensive on the market, while basically serving the same purpose as the ROFORC. The only drawback is that the new device presented here is not as foolproof as the original, and does not allow for separate containment of the filter from the start of the oil change to finish. It is felt that a second, less expensive model, such as the one presented here, would offer an alternative to the public, giving the public two options based on performance and price. By introducing this less costly device to the market, the inventor intends to make recycling used oil filters and used oil more palatable pricewise to a broader market. The broader the market, the better the chance that more do-it-yourselfers (DIYs) will begin recycling their spent wastes. There will still be a market for the original ROFORC, as it will be directed at the high end market which will be willing to pay more for the extra control it affords. Much of the same background presented in that application is relevant to this application as well.

In recent years, the general public has become more aware of the benefits to the overall environment of recycling spent motor oil. Initially, used oil recycling was initiated to recover energy. Regardless, considerable amounts of spent oil not being recycled are being disposed of in a fashion that is injurious to the environment, specifically through groundwater, surface water and soil contamination. Thus, the emphasis of spent oil recycling has expanded from energy to include environmental concerns. Consequently, many products are on the market to capture, store and transport waste oil, particularly that oil generated by a do-it-yourself (DIY) oil changer. But, as environmental consciousness has heightened, other aspects of oil changes are now being addressed.

It is known that an individual used oil filter contains a residual amount of oil. That residual oil drains over time. Considering the amount of spent oil filters either disposed of improperly or landfilled, the collective amount of oil is considerable. In some states, it is now illegal (or soon will be) to dispose of used oil filters in municipal landfills. These states are attempting to find different ways to properly handle and recycle these used filters. Consequently, recycling of used oil filters is becoming a new industry. Curbside collection programs and community aggregation centers are being set up across the country. These programs are intended to make it as convenient as possible for DIYs to properly dispose of their used oil and filters, instead of illegal disposal.

Many used filters received from DIYs for recycling are received in paper filter boxes, plastic bags, wrapped in newspaper or other throw away containers. In many cases, used oil itself is being returned in disposable containers. This presents another problem: handling and disposal of these throw-away containers. It is impossible to evacuate all of the waste oil from these containers without using a rag, or some sort of rinsate. This, in turn, produces more wastes. Thus, these disposable containers are contributing to the oily waste problem they are supposedly alleviating.

This inventor works in the oil filter recycling industry, and can foresee increasing problems in both the area of DIYer cooperation, due to inconvenience, as well as in the secondary waste streams generated. It was concluded a device was needed for the transport of the used filter. Better yet, what was needed was a device that would allow the filter to drain, while keeping the filter and oil drained from it separate during transport and evacuation of the drained oil. Finally, it was determined that the receptacle that received the filter's drained oil could also be configured to capture and store the oil from the vehicle's crankcase. In devising such an apparatus, this inventor developed an answer to the problem of disposable containers, and more importantly, to the problem of inconvenience to the user.

With this device, the DIYer can capture the oil drained from the engine, place the used filter in a draining mode, and seal everything in a single container, in one or, ration. The products currently on the market, and/or in the prior art, call for draining the filter for a period of time, then returning at the end of that period to prepare the receptacle for storage and transport, but none allow for storage and transport of the drained filter. This inventor's device allows for the collection of the crankcase oil, drainage of the used oil filter, and storage of both the oil and filter in a segregated fashion, ready for transport, while eliminating any further preparation.

As mentioned, search of prior art reveals that devices have been contrived for the capture, storage and eventual transport of used oil. But few of these devices provide for draining the used oil filter, and none allow for the transport of the filter in a way which keeps it separate from the oil that has drained from it.

Foremostly from an economic standpoint, Pollacco sets forward arguments for recycling oil, as well as the problems faced by the do-it-yourselfer (DIY)in both U.S. Pat. No. 4,533,042 (1985) and U.S. Pat. No. 4,403,692 (1983). He addresses the draining of the filter but not segregated storage and transport of the drained filter.

Other prior art, as well as commercial products on the market, show substantial advances in the area of capturing, storing and transporting used crankcase oil. U.S. Pat. No. 4,823,947 (1989) to Maynard, Jr.; U.S. Pat. No. 4,702,290 (1987) to Perez; and U.S. Pat. No. 4,974,647 (1990) to Eastom are further examples of prior art structures for receiving waste oil. The device set forth by Maynard, Jr. in U.S. Pat. No. 4,823,947 (1989) principally is devised for the collection of oil drained from the crankcase, but also allows for draining the oil filter. In one claim of the same patent, Maynard, Jr. states that the drainage opening is of size sufficient to allow the passage of an object the size of an oil filter into the storage cavity. This defeats the purpose of draining the filter, since it is re-introduced into the oil which was drained from it. Or, an additional device is needed to transport the drained filter. Even with this additional device, a two step process is necessary to drain the filter, then return to ready it for transport.

The U.S. Pat. No. 4,702,290, (1987) to Perez sets forth a collection pan that allows oil collection from both the engine and a draining filter, which in turn allows transference of the collected used oil from the collection pan into household containers for transport, but makes no allowances for the filter. In U.S. Pat. No. 4,974,647 (1990) Eastom's device is similar to that of Perez' and Maynard's, in that it allows for the drainage of the filter, but no way allows storage or transport of the spent filter in a segregated fashion.

It is important that the filter be as free of internal, as well as external, residual oil when it is removed from its transport container. Transferring from a singular container to a bulk container can prove a messy task if the filter is coated with oil or has oil draining from it.

Like the others listed above, Tupperware (TM) has a device on the market with patent pending, which allows for the capture, storage and transport of used oil, all within the same apparatus. It also allows for the drainage of a used oil filter, but it does not provide for the storage or transport of the drained filter. This product is much like the previously mentioned device under U.S. Pat. No. 4,702,290 (1987) to Perez, without the control valve.

While some of these products take into account the drainage of the used oil filter, none allow for the clean, separate storage or transport of said drained filter.

In other related patents, U.S. Pat. No. 4,020,922 (1977) to Klasel sets forth an apparatus whereby a removed used oil filter is captured in a bag as it is removed from an engine which provides for the safe and clean removal of used oil filters. But this apparatus is primarily for the removal, not the drainage, storage or transport of said filter. The patent application Ser. No. 08/289246, ROFORC, submitted by the inventor allows for the capture of the filter as it is removed from the engine block, much like Klasel's bag. The device presented in this application does not provide for that additional control.

Other patents have been granted for devices that work as funnel and bag waste oil collectors, and kits whereby new oil and used oil are both furnished and received respectively by one apparatus. None of these devices allow for the clean transport of the filter.

At the time that the patents listed above were submitted, the major objective from both an ecological and economical standpoint was the capture and transport of used motor oil for recycling. Since that time, used oil filters have been added to the list of concerns. Consequently a convenient, environmentally and economically sound method of management of these filters is necessary. A reusable container such as this invention meets all of these criteria.

OBJECTS AND ADVANTAGES

As such, several objects and advantages of this invention are:

(a) the drainage of a removed oil filter into a receptacle;

(b) to allow for the capture of used oil directly from the engine oil pan into the same receptacle that the filter drains into;

(c) to hold drained filter separate from drained and collected oil, thus keeping it clean;

(d) the capacity to seal used filter and drained oil in one containment system immediately upon completing the oil change, thus eliminating the waiting period for the filter to drain and/or cool off;

(e) and the means to safely, conveniently, and cleanly store and transport both drained used filter and oil to a recycling point; while (f) enabling the re-use of the apparatus, thus reducing oily waste from the wastestream.

While prior art allows for the collection, storage and transport of used oil, it does not allow for the clean, segregated storage and transport of the used oil filter, particularly in a reusable apparatus that also stores and transports the used oil collected from both the engine and spent filter.

The previous discussion of background and prior art are relevant to both the inventor's first patent application 08/289246 ROFORC, and this application. The major points of difference between the first application and the one presented here is control of the spent filter during the oil change, and safeguards for segregation of filter and oil during storage and transport. The price differential between these two devices presents a substantially lower priced option which will broaden the market appeal, and thus increase recycling. Nevertheless, these two devices are the only devices found through research of prior art and the open market which allow for the drainage, storage and transport of both the used oil filter and used oil sealed in one device. Further objects and advantages will become apparent from a consideration of the drawings and ensuing description.

SUMMARY

The present invention provides a convenient way for the do-it-yourself oil and filter changer to safely and cleanly drain the used oil from the oil filter; seal and store both filter and drained crankcase oil in the same container. In so doing, the invention keeps the drained filter separate from the drained and collected oil. It also eliminates the need for the DIY to return and attend to a drained filter, since this device allows for all of this to take place in one operation. At the time of disposal, the DIY need simply pick up the apparatus, with contents inside. The apparatus can be transported to a local aggregation center for recycling, or can be used in a curbside collection program. The invention has the advantage of re-use time and again, thus reducing the need for disposing of oily bags, boxes, milk jugs, and other storage and transport wastes now currently adding to our landfill and water pollution problems. By allowing the DIY the convenience of using a sealed container for storage and transport of the used filter, as well as the used oil, the temptation of improper disposal is lessened. No waiting period is needed to allow the oil filter to drain before sealing it in the device. The convenience of this one step operation will also help deter improper disposal. With the rigid reusable structure of the invention, several benefits are inherent over the current standard mode of operation. Subjection to heat does not adversely affect the invention as it would plastic bags or paper boxes. In addition, if the filter is mangled in some way in removal, leaving sharp edges or points, the filter container on the invention is less susceptible to punctures, tears, or cuts than conventional bags or boxes. The invention solves a problem that has recently become apparent as used oil filters have been labeled a culprit of soil and water pollution. By allowing the do-it-yourselfer a convenient, safe, and clean means to manage used oil filters along with used oil, it checks the tendency to improperly dispose of these recyclable wastes.

DRAWING FIGURES

Figure 1:
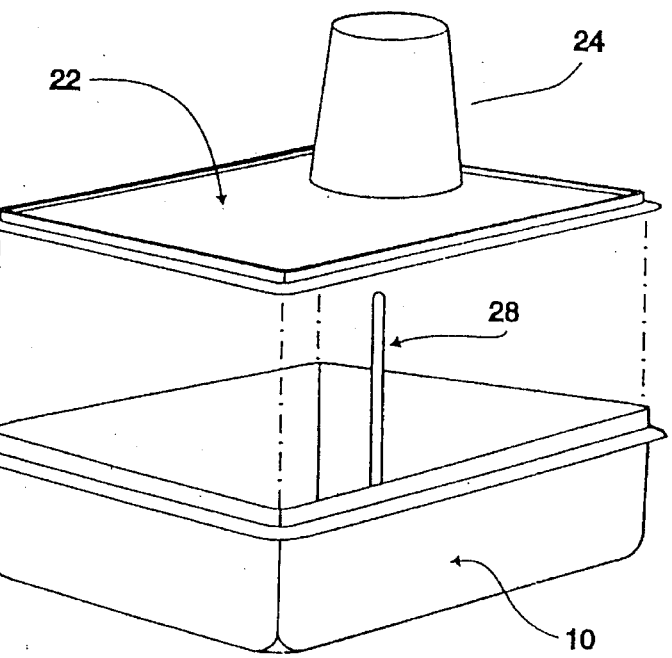
FIG. 1 is a perspective view of the preferred embodiment.
Figure 1A:
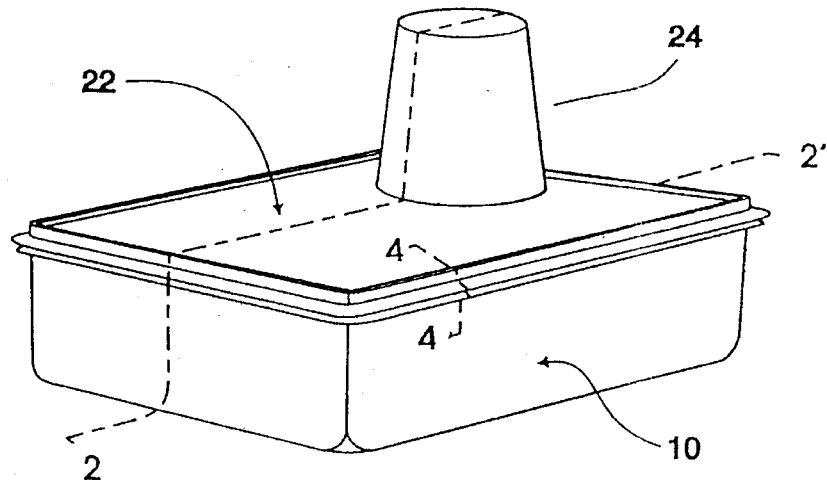
FIG. 1A is a perspective view of the preferred embodiment assembled.

REFERENCE NUMERALS IN DRAWINGS OF THE PREFERRED EMBODIMENT 10 oil collection pan
12 pan bottom
14 pan sides
16 filter suspension spike anchoring collet
18 oil collection pan male flex seal lip
20 oil collection pan grip extension
22 oil collection pan lid
24 oil filter cavity
26 lid female flex seal
28 oil filter suspension spindle

DETAILED DESCRIPTION OF THE PRESENTLY EMBODIMENT

FIG. 1 shows a perspective view of the preferred embodiment of my invention, a used oil filter and oil recycling device. This reusable device consists of three major components: a collection pan, or pan 10; a collection pan lid, or lid 22; and a oil filter suspension spindle, or spindle 28.

Collection Pan

As seen in FIG. 1, collection pan 10 consists of a flat rectangular plate which serves as a pan bottom 12, with a set of sidewalls, or sidewalls 14, upwardly extending from the perimeter of pan bottom 12, leaving an open top to collection pan 10. Sidewalls 14 are equally tapered outward slightly from bottom to top, leaving the top opening rectangular and slightly larger than bottom 12.

On the outside of sidewalls 14, and approximately 1 inch below the upper edge, a downward curved collar extends outward, providing a fingertip grip for movement and lifting of pan 10. This grip is referred to as an oil collection pan grip extension, or grip 20. The shape and relative size of grip 20 is more clearly shown in FIG. 2. The upper edge of sidewalls 14, extending above grip 20 is shaped to form the male counterpart of Tupperware (TM) type friction-tension seal, or male seal 18. Male seal releasably engages with a female counterpart friction-tension seal 26, along the outer perimeter of lid 22. The capacity of pan 10 is approximately 2 gallons U.S., allowing for five quarts U.S. and two to three inches of headroom. The four corners of pan 10 made up by sidewalls 14 are rounded, as well as the corners where bottom 12 joins sidewalls 14.

Figure 3:
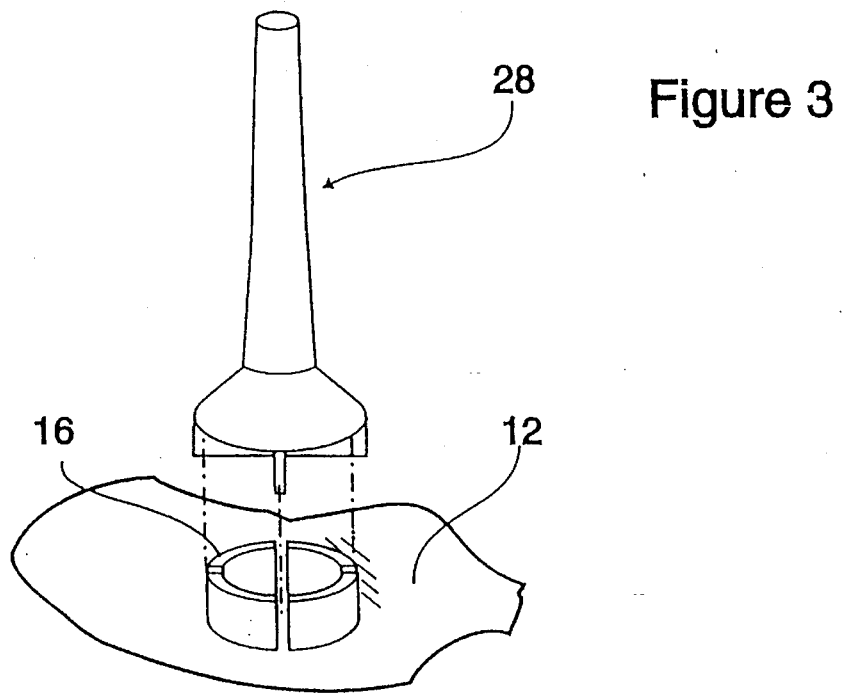
FIG. 3 is a cut-away perspective view of the collection pan bottom featuring filter suspension spindle and corresponding collet.

Centered longitudinally and one-third along the length of bottom 12, is a filter suspending spindle collet 16. As seen in FIG. 3, extending upward from the inner surface of bottom 12, collet 16 is a circular collar divided into four equal parts by slots extending perpendicular to bottom 12. Collet 16 serves as an anchor for filter suspending spindle 28. These slots allow for easier displacement of oil from collet 16, in the event that spindle 28 is introduced into the collet with oil in pan 10. The height and diameter of collet 16 is adequate to provide a stable base for spindle 28.

Filter Draining Spindle

Figure 2:
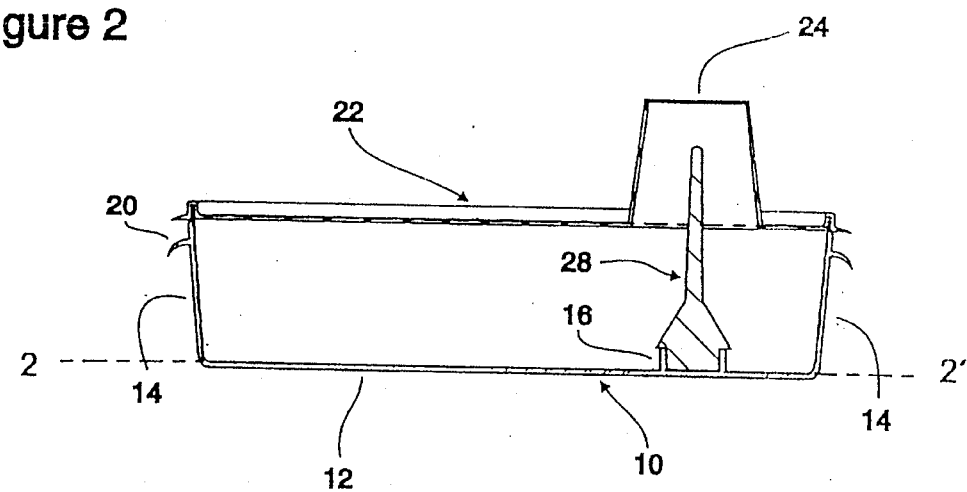
FIG. 2 is side plan cross-sectional view of the preferred embodiment.
Figure 5:
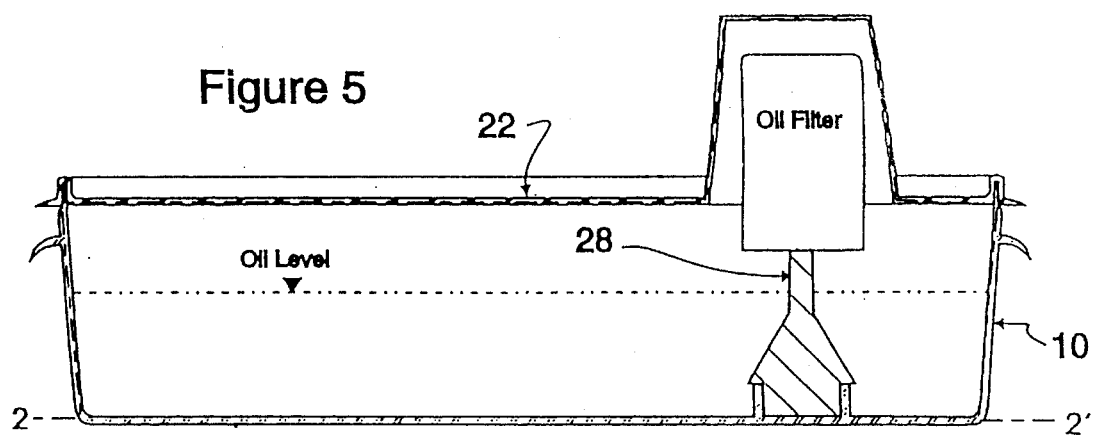
FIG. 5 is a side plan cross-sectional view showing filter in draining position and level of collected oil.

As also seen in FIG. 3, spindle 28 is a cylindrical rod through its upper two-thirds, then tapers out in the bottom third to form a cone which has a bottom diameter slightly larger than the outer diameter of collet 16. Extending downward from the bottom of the base of this cone are a pair lugs transverse to each other to form an "x" arrangement. These lugs fit into the slots of collet 16. The top of spindle 28 is blunt, so as to reduce the possibility of injury to the user. As seen in FIG. 2, once in place, spindle 28 extends beyond the upper lip of pan 10. This allows for the removed filter to rest on the spindle. By placing the center cylindrical hollow of the filter over the spindle, the filter is suspended above the collected oil in pan 10. The diameter of spindle 28 is approximately 3/8 inch along its upper two thirds. This allows for the spindle to fit all the way up into the suspended filter, insuring stability for the draining filter. This is illustrated in FIG. 5.

Oil Collection Pan Lid

Figure 4:
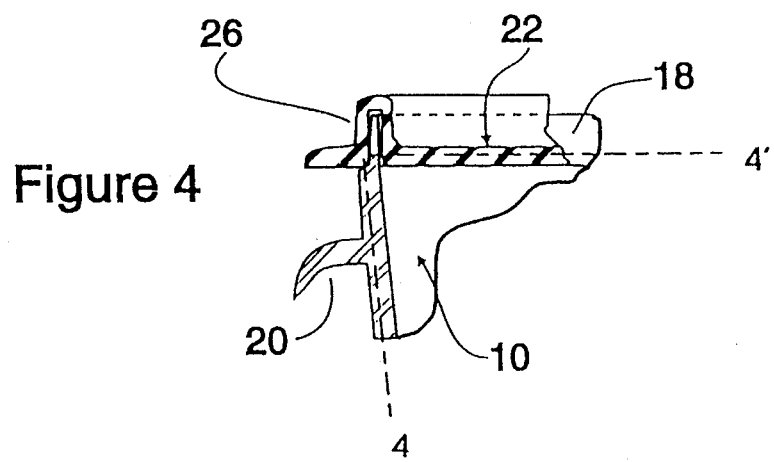
FIG. 4 is a side plan cross-sectional view of the seal made by pan and lid.

The final component of the device is oil collection pan lid, or lid 22. As seen in FIG. 1, lid 22 is a flat rectangular plate that corresponds to the opening of pan 10. At is edge is a female flex type friction tension seal 26 that mates releasably with its male counterpart, male seal 18, which is the upper edge of sidewalls 14. This seal is seen in FIG. 4. Rising from lid 22 is a filter cavity, or cavity 24. When lid 22 is in place on pan 10, cavity 24 is centered above spindle 28. Cavity 24 is tapered out from top to bottom slightly, having an upper diameter of approximately four and one half inches, and a diameter of approximately 5 inches at where it intersects lid 22. Cavity 24 is open to the underside of lid 22. Cavity 24 extends upward approximately six inches from the top of lid 22. Once lid 22 is attached to pan 10, an oil tight seal is completed with collected oil and spent filter entirely within the device.

All components of the apparatus are formed of inexpensive yet durable polymer materials which are non-reactive to petroleum products. These polymer materials can be worked by conventional molding techniques to provide the desired configurations and dimensions.

Method of Operation

Lid 22 is removed from pan 10, and pan 10 is placed under the vehicle. The oil filter is removed and placed on suspension spindle 28. Pan 10 can be placed directly below the point from which the oil filter is removed to catch any overflow. Once the new filter is in place, then pan 10 can be placed under the crankcase drain opening, and oil collected from the crankcase. Spindle 28 is situated to one end of pan 10, to allow for more clearance of pan 10 under the crankcase. After the oil is drained, pan 10 is removed and lid 22 placed on pan 10 with filter in place, providing an oil tight seal. After allowing sufficient time for filter drainage, the device can be carried to a recycling center, or set out for curbside collection, for depositor the contents into the recycling stream. Lid 22 is removed, the oil filter is removed and placed in its appropriate receptacle and the oil is poured off over one of the corners of pan 10 as a pour point.

If necessary for additional clearance under the vehicle, after initially draining the filter, lid 22 can be placed upside down, and the filter can be placed on its top in filter cavity 24. Spindle 28 can be removed to provide the additional clearance. After the oil change is completed, spindle 28 can be replaced in its collet 16, the filter placed back on the spindle and lid 22 attached as normal to pan 10.

Second Embodiment

A second embodiment was conceived that would use a partial or full screen across the interior of the pan. This screen would be just above the six quart U.S. capacity level of the pan, and parallel to the bottom. The screen would serve as the suspension device for the draining filter.

Ramifications of Second Embodiment

Several problems are inherent with this design. The screen would have to have some type of anchor molded into it to keep the filter in place and standing upright. Most likely this anchor would take the form of a spindle or collar extending upward from the screen. Secondly, the screen itself would have to anchored in the pan to prevent it from falling out during the pour-off of the oil. Lastly the screen would have to be removable in order to clean debris from the bottom of pan, if necessary.

Other Embodiments and Their Ramifications

It is possible that this device could be enlarged to handle two oil changes. It would have to have either a deeper pan, or one that is larger in length and width. It would also have to have a larger filter cavity or two of the size of the preferred embodiment. The weight and bulkiness of such a device would prove unwieldy. Also, clearance would become a problem, with one drained filter already in place.

Summary, Ramifications and Scope

Accordingly, the reader will see that the invention presented in this application provides a way for the do-it-yourself oil and filter changer to safely and cleanly drain used oil from the crankcase and filter, seal and store both filter and drained filter oil in the same device that crankcase oil is stored in while keeping the drained filter separate from the drained and collected oil. This allows for ease of transport to a collection center or fits the needs of a curbside collection system. The cost of this device to the do-it-yourselfer will be less than that of the ROFORC submitted in patent application 08/289246. The cost difference is a result of less parts, finishing, and assembly. The original ROFORC embodiment will have a market, but the embodiment here has a better chance of capturing the lower end market, according to price. Since most of the public resorts to changing their own oil due to cost, then obviously the difference in price between these two devices could be a factor.

The invention presented in this application has the following advantages:

Re-use time and again, thus reducing the need for disposing of oily bags, boxes, milk jugs, and other storage and transport wastes now currently adding to our landfill and water pollution problems.

By allowing the DIY the convenience of using a sealed container for drainage, storage and transport of the used filter, as well the used oil, the temptation of improper disposal is lessened.

No waiting period is needed to allow the oil filter to drain before placing it in a box, bag, etc. Once the filter is removed from the vehicle and placed in the apparatus, it is sealed and allowed to drain, negating the need of the DIY to return at a later time to attend to the oil filter. This one step operation will also help deter improper disposal, by increasing convenience to the user.

Subjection to heat by hot oil filters will not adversely affect the invention as it would plastic bags or paper boxes.

If the filter is mangled some way in removal, leaving sharp edges or points, this device is less susceptible to punctures, tears, or cuts than bags or boxes.

By having tapered sides and filter cavity, the embodiment will pack easier and take less space by packing in stacks of pieces.

The invention solves a problem that has recently become more apparent as used oil filters have been labeled a culprit of land and water pollution. By allowing the do-it-yourselfer a convenient, safe and clean means to manage his used oil filter along with his used oil, it hampers the tendency to improperly dispose of these recyclable wastes.

Although the description above of the preferred embodiment contains many specificities, these should not be construed as limiting the scope of this invention but as merely providing illustrations of the presently preferred embodiment of this invention. For example:

The shape of the oil collection pan could be square, round, oval, etc.

The sealing flanges could be other flex type, such as screw-on or a clamp type seal.

A wide variety of sealing means exists as well, including: neoprene gaskets, rubber gaskets, cork gaskets, etc.

The filter suspension spindle could be shaped and attached differently.

The invention could also be made of several different types of plastics, as well as metals.

Nodules could be designed into the bottom of the oil collection pan to reduce surface area contact between the pan and the surface it rests upon.

Handles could be used instead of the fingertip grip flange around the exterior of the pan, and clamps could be integrated into the handles to help secure the lid.

Baffles could be molded into the bottom of the pan to reduce movement of oil during transport.

connecting flanges, and other components of the preferred embodiment could be changed according to molding design changes.

Surface of the invention could be designed to receive a variety of graphics or written materials, either permanent or removable.

It is apparent from previously mentioned examples that embodiments other than the preferred can achieve the same basic results as the preferred embodiment. Thus, the scope of the invention should be determined by the appended claims and their legal equivalents, rather than by the examples given.

What I claim is:

1. A device for the management, handling, storage, and transportation of spent liquids and at least one oil filter collected during one or more oil changes comprising:

a) a receptacle having a bottom member and a peripheral wall upwardly extending from the outer edge of said bottom member to define an interior of said receptacle to form a shallow pan of large enough size to allow for collecting of the spent fluids without the use of funneling means, and to allow for movement and transporting of the spent liquids without spillage; and b) a support means attached to said receptacle which provides support for the oil filter over said bottom member, keeping the filter in a suspended and stable position above the spent liquids throughout drainage, storage and transport, said receptacle including at least one annular collar projecting upwards from said bottom member into said interior and engaging and firmly affixing said support means; and c) a lid that releasably engages with said receptacle providing an oil tight seal for storage and transport, said lid being constructed in such a way as to provide adequate space for the suspended filter to remain in its suspended position above the spent liquids when said lid is engaged on said receptacle.

2. The device set forth in claim 1 wherein said receptacle is rectangular in shape, providing for the pouring off of spent liquids by a corner.

3. The device set forth in claim 1 wherein said support means comprises at least one spindle projection to be of a diameter sufficiently small to fit inside the inner tube cavity of the oil filter, allowing deep enough penetration in said inner cavity to keep the filter upright during drainage, storage and transport.

4. The device set forth in claim 3 wherein said support means comprises means to firmly and removably interlock with said annular collar.

5. The device set forth in claim 1 wherein said lid is substantially flat with the exception of a hollow cavity extending upwards from a flat surface, said hollow cavity is positioned directly over said support means, forming a filter cavity which allows room for said lid to be attached to said receptacle with the filter in place on said support means, resulting in an oil tight seal of said device with oil and filter separated inside the device.

6. The device set forth in claim 5 wherein said lid is removably joined to said receptacle with a friction and tension sealing means.

7. The device set forth in claim 5 wherein said filter cavity is contoured to the general shape and size of the oil filter.

\* \* \* \* \*